US009822832B2

(12) United States Patent
Takeo et al.

(10) Patent No.: US 9,822,832 B2
(45) Date of Patent: Nov. 21, 2017

(54) DISC BRAKE DEVICE

(71) Applicants: Yuichi Takeo, Seto (JP); Yoshitaka Ishimaru, Kariya (JP); Yosuke Kamiya, Kariya (JP); Yohei Komizo, Miyoshi (JP)

(72) Inventors: Yuichi Takeo, Seto (JP); Yoshitaka Ishimaru, Kariya (JP); Yosuke Kamiya, Kariya (JP); Yohei Komizo, Miyoshi (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 0 days.

(21) Appl. No.: 14/786,393

(22) PCT Filed: Apr. 24, 2014

(86) PCT No.: PCT/JP2014/061587
§ 371 (c)(1),
(2) Date: Oct. 22, 2015

(87) PCT Pub. No.: WO2014/175388
PCT Pub. Date: Oct. 30, 2014

(65) Prior Publication Data
US 2016/0084329 A1    Mar. 24, 2016

(30) Foreign Application Priority Data
Apr. 25, 2013   (JP) .................. 2013-092193

(51) Int. Cl.
*F16D 65/097* (2006.01)
*F16D 55/2265* (2006.01)
*F16D 55/226* (2006.01)

(52) U.S. Cl.
CPC ....... *F16D 65/0972* (2013.01); *F16D 55/226* (2013.01); *F16D 55/2265* (2013.01)

(58) Field of Classification Search
CPC . F16D 65/0972; F16D 55/226; F16D 55/2265
See application file for complete search history.

(56) References Cited

U.S. PATENT DOCUMENTS 4,180,148 A * 12/1979 Souma ................ F16D 65/0972
188/73.38
6,003,642 A    12/1999 Mori et al.
(Continued)

FOREIGN PATENT DOCUMENTS

JP   08-261260      * 10/1996
JP   10-103393 A      4/1998
(Continued)

OTHER PUBLICATIONS

International Search Report (PCT/ISA/210) dated Jun. 3, 2014, by the Japanese Patent Office as the International Searching Authority for International Application No. PCT/JP2014/061587.
(Continued)

*Primary Examiner* — Vishal Sahni
(74) *Attorney, Agent, or Firm* — Buchanan Ingersoll & Rooney PC

(57) ABSTRACT

A disc brake device includes flat springs assembled in a support body and holding the brake pad back plates. The flat springs have a C-shaped part provided with: a connection surface part comprising a pad-receiving surface part; an outer circumferential surface part extending along the rotor circumferential direction from the end region of the connection surface part in the rotor radially outward direction; and an inner circumferential surface part extending along the rotor circumferential direction from the end region of the connection surface part in the rotor radially inward direction. Each flat spring also has a tongue-shaped part that: extends towards the connection surface part from the tip region of the inner circumferential surface part in the rotor circumferential direction; elastically engages an inner circumfer- (Continued)

ential wall of a recess at a tip region of the tongue-shaped part; and biases the pad-receiving surface part towards a base wall of the recess.

6 Claims, 6 Drawing Sheets

(56) References Cited

U.S. PATENT DOCUMENTS

| | | | | |
|---|---|---|---|---|
| 6,269,915 | B1* | 8/2001 | Aoyagi | F16D 65/0977 188/205 A |
| 2006/0260884 | A1* | 11/2006 | Hayashi | F16D 65/0977 188/71.1 |
| 2007/0240946 | A1* | 10/2007 | Schorn | F16D 65/095 188/73.38 |
| 2013/0001024 | A1* | 1/2013 | Odaira | F16D 55/226 188/72.3 |
| 2013/0133999 | A1* | 5/2013 | Ishiguro | F16D 65/005 188/233.3 |
| 2013/0192939 | A1* | 8/2013 | V. | F16D 65/0972 188/73.38 |
| 2014/0131148 | A1* | 5/2014 | Plantan | F16D 65/097 188/73.38 |
| 2014/0291083 | A1* | 10/2014 | Bernard | F16D 55/2262 188/250 G |

FOREIGN PATENT DOCUMENTS

| | | |
|---|---|---|
| JP | 4740416 B2 | 8/2011 |
| JP | 2011-202779 A | 10/2011 |

OTHER PUBLICATIONS

Written Opinion (PCT/ISA/237) dated Jun. 3, 2014, by the Japanese Patent Office as the International Searching Authority for International Application No. PCT/JP2014/061587.

* cited by examiner

[FIG.1]
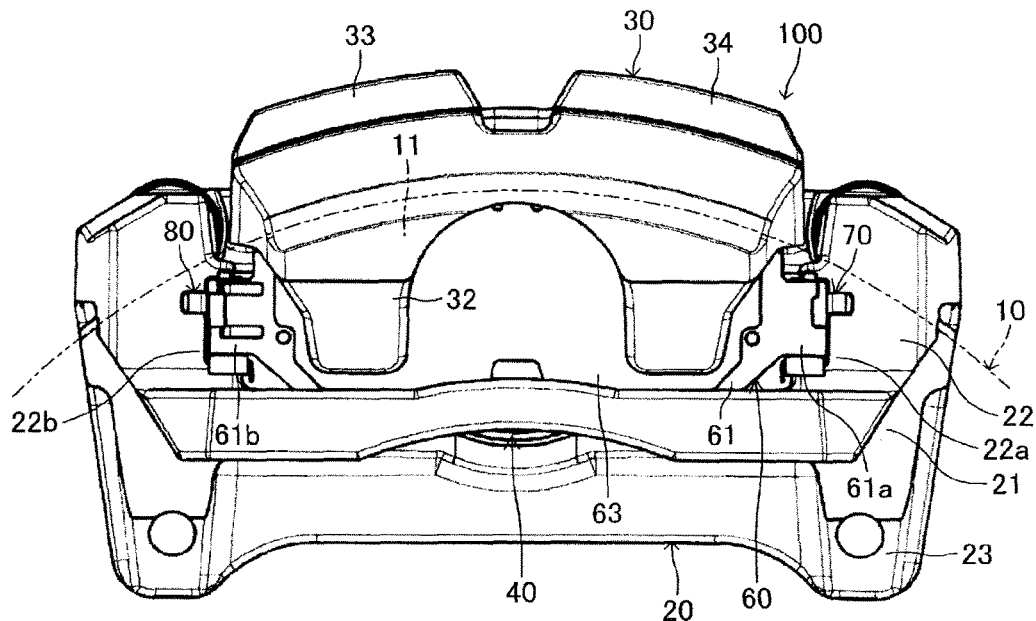
[FIG.2]
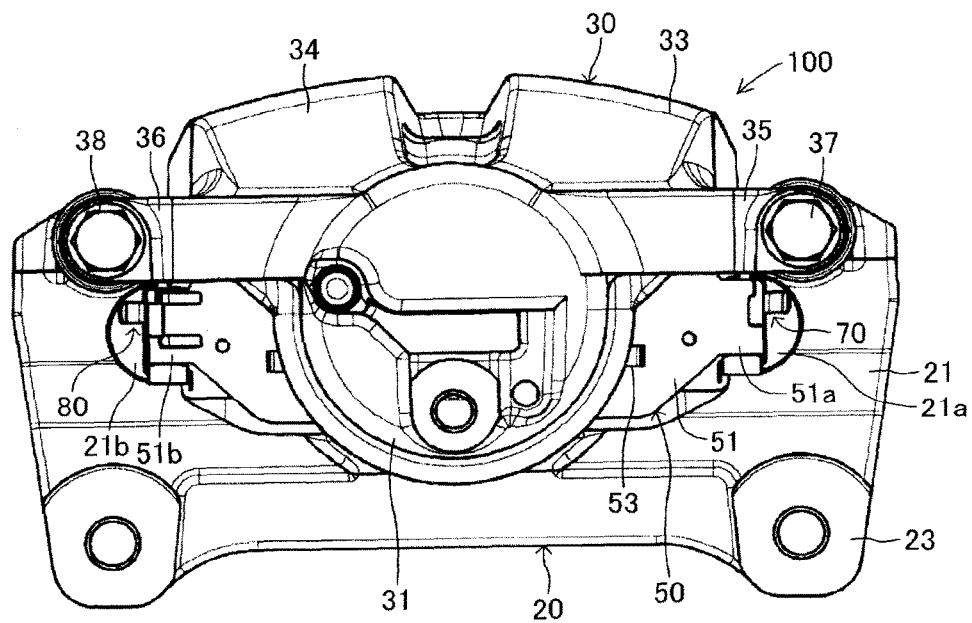

[FIG.3]
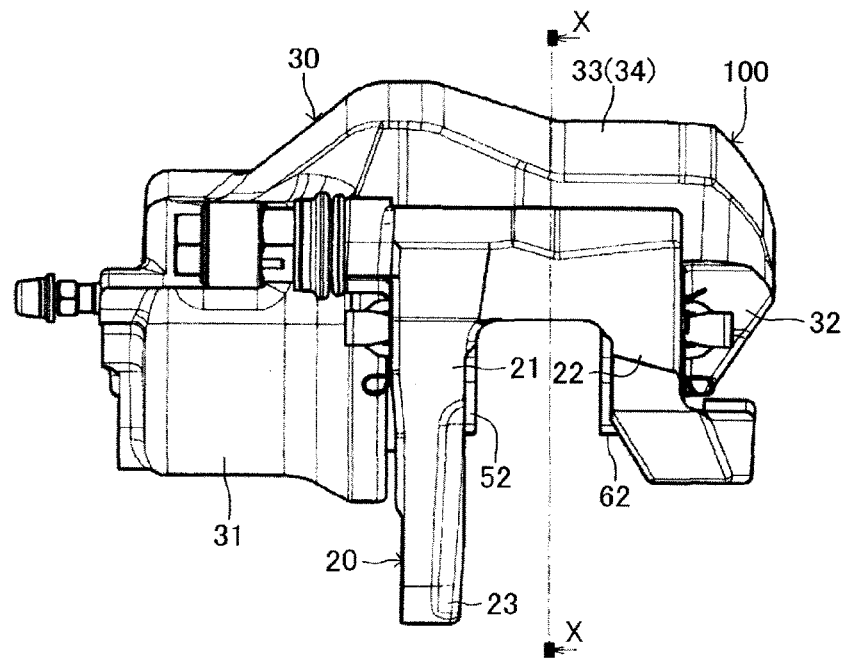
[FIG.4]
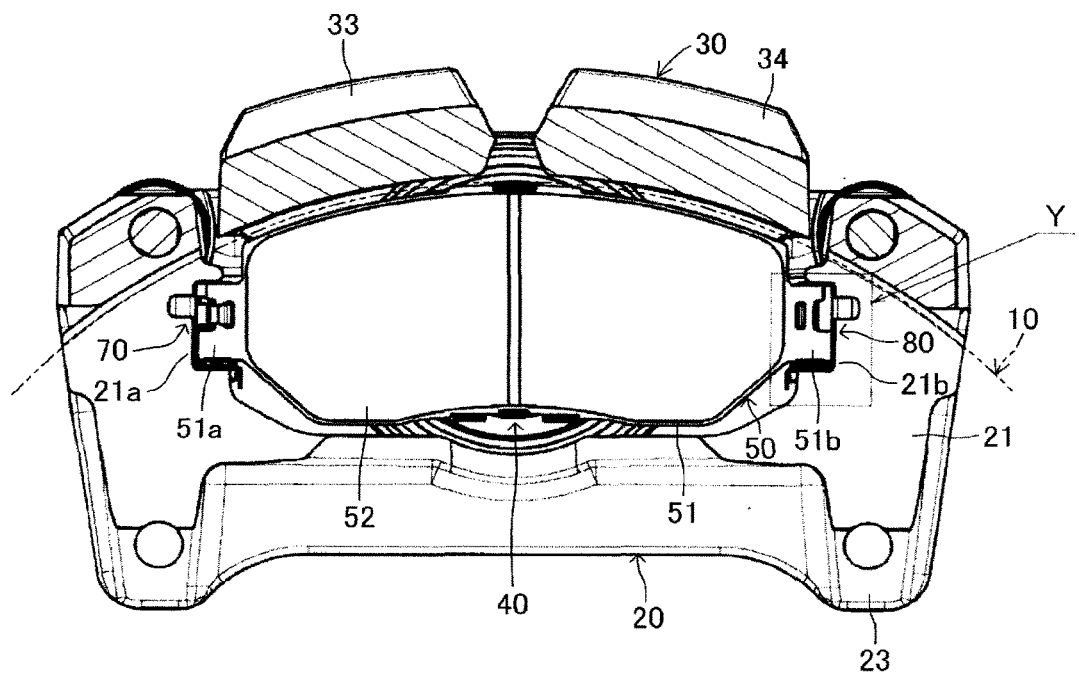

[FIG.5]
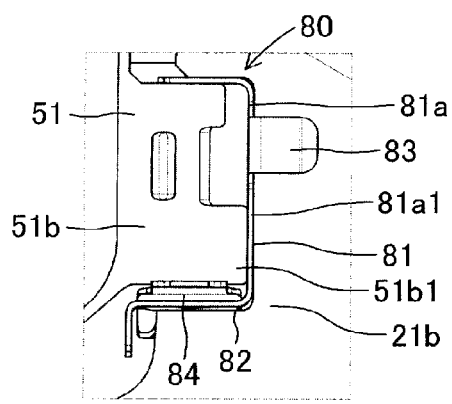
[FIG.6]
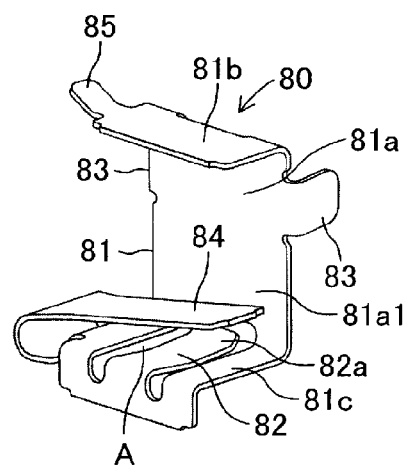

[FIG.7]
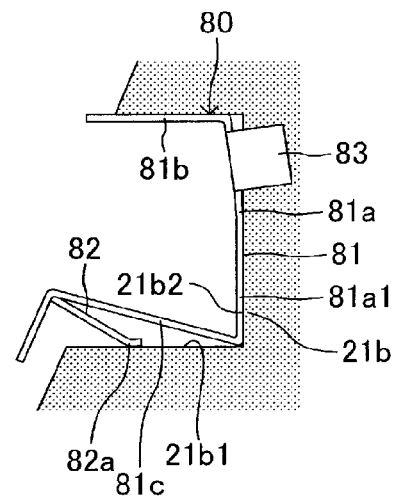
[FIG.8]
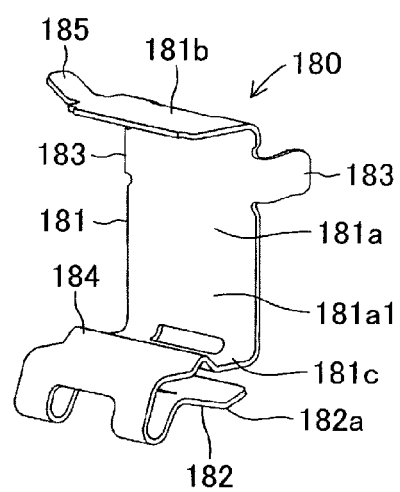

[FIG.9]
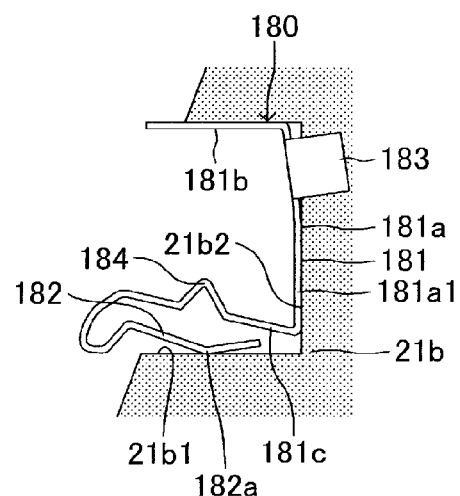
[FIG.10]
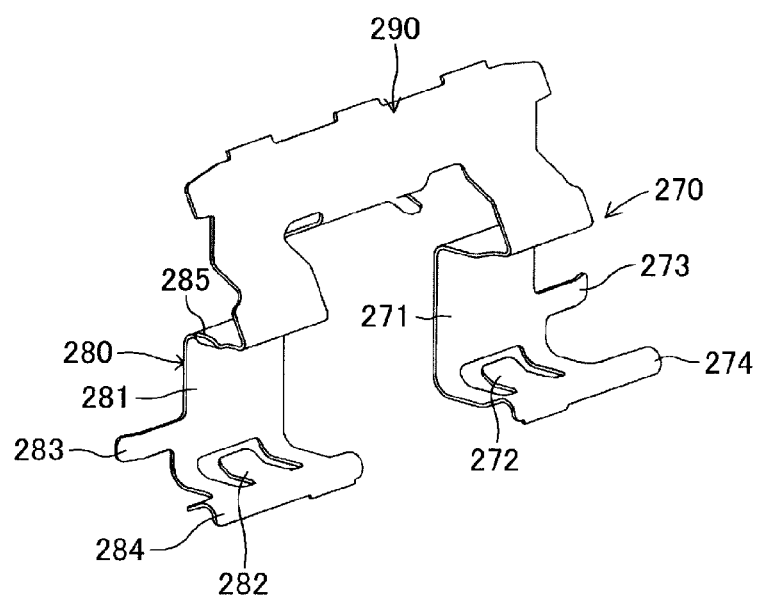

[FIG.11]
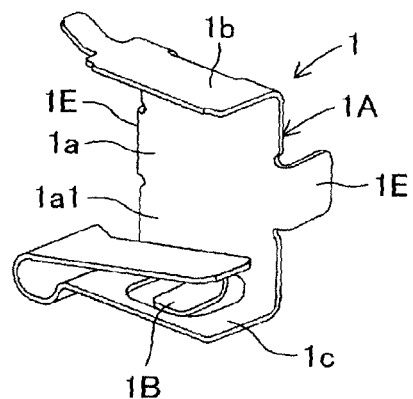
[FIG.12]
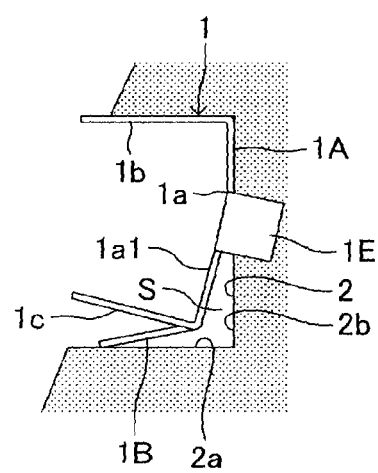

DISC BRAKE DEVICE

TECHNICAL FIELD

The present invention relates to a disc brake device, and particularly relates to a disc brake device including a disc rotor configured to rotate integrally with wheels, a support member assembled to a vehicle body, a pair of brake pads disposed to sandwich part of the disc rotor and assembled to the support member so as to be movable rotor axially and rotor circumferentially, and a push member configured to push a backing plate of each of the brake pads toward the disc rotor. The backing plate of each of the brake pads is provided, at a rotor circumferential end, with a protrusion, the support member is provided with a recess accommodating the protrusion at the backing plate so as to be movable rotor axially and rotor circumferentially, the protrusion and the recess are provided therebetween with a leaf spring assembled to the support member and retaining the backing plate. The protrusion has a rotor circumferential tip end set to engage so as to transmit torque, with a base wall of the recess via a pad-receiving surface part of the leaf spring.

BACKGROUND ART

A disc brake device of this type is disclosed in JP 4740416 B1, for example. As exemplified in FIGS. 11 and 12, a leaf spring 1 includes a C-shaped part 1A having a connection surface part 1a provided with a pad-receiving surface part 1a1, an outer circumferential surface part 1b extending rotor circumferentially from a rotor radially outward end region of the connection surface part 1a, and an inner circumferential surface part 1c extending rotor circumferentially from a rotor radially inward end region of the connection surface part 1a, and also includes a tongue-shaped part 1B that extends rotor circumferentially from the rotor radially inward end region of the connection surface part 1a, has a tip region elastically engaging with a side wall (inner circumferential side wall) of a recess 2, and biases the pad-receiving surface part 1a1 so as to be spaced apart from s base wall 2b of the recess 2 (specifically, biases the connection surface part 1a of the leaf spring 1 upward and leftward in FIG. 12). The leaf spring 1 exemplified in FIGS. 11 and 12 is provided separately to each of an inner pad and an outer pad. The leaf spring 1 is provided to the connection surface part 1a in a state where support retentive parts 1E elastically sandwiching the recess 2 along a rotor axis are rotor radially close to the pad-receiving surface part 1a1.

SUMMARY OF INVENTION

Technical Problem

In the disc brake device disclosed in JP 4740416 B1, the tongue-shaped part 1B provided to the leaf spring 1 extends rotor circumferentially from the rotor radially inward end region of the connection surface part 1a, has the tip region elastically engaging with the side wall (inner circumferential side wall) 2a of the recess 2, and biases the pad-receiving surface part 1a1 so as to be spaced apart from the base wall 2b of the recess 2. The pad-receiving surface part 1a1 is accordingly warped as emphasized in FIG. 12, the leaf spring 1 and the base wall 2b of the recess 2 forma gap S therebetween, which provides the leaf spring 1 with the spring property. The gap S can be formed also in a case where the support retentive parts 1E disposed rotor radially close to the pad-receiving surface part 1a1 are elastically deformed into a substantially V shape to sandwich the recess 2 and the pad-receiving surface part 1a1 is accordingly curved into an arch shape.

While the disc brake device disclosed in JP 4740416 B1 is braking, the brake pad has unstable behavior due to the spring property of the leaf spring 1 in a case where the rotor circumferential tip end of the protrusion (not depicted in FIG. 12) provided at the backing plate of the brake pad engages so as to transmit torque, with the base wall 2b of the recess 2 via the pad-receiving surface part 1a1 of the leaf spring 1. This configuration possibly generates braking noise due to unstable behavior of the brake pad during braking.

Solution to Problems

The present invention has been devised to achieve the object mentioned above (suppression of unstable behavior of a brake pad due to a gap formed between a base wall of a recess and a pad-receiving surface part of a leaf spring), and provides the disc brake device described above, characterized in that the leaf spring includes a C-shaped part having a connection surface part provided with the pad-receiving surface part, an outer circumferential surface part extending rotor circumferentially from a rotor radially outward end region of the connection surface part, and an inner circumferential surface part extending rotor circumferentially from a rotor radially inward end region of the connection surface part, and includes a tongue-shaped part that extends from a rotor circumferential tip region of the inner circumferential surface part or the outer circumferential surface part toward the connection surface part, has a tip region elastically engaging with a side wall (an inner circumferential side wall or an outer circumferential side wall) of the recess, and biases the pad-receiving surface part toward the base wall of the recess.

In order to embody the present invention described above, the tongue-shaped part can be formed by bending a tongue that is provided as a cut part at part of the inner circumferential surface part or the outer circumferential surface part. Furthermore, the tongue-shaped part can be formed by bending a tongue that is provided by extending by a predetermined amount, part of the inner circumferential surface part or the outer circumferential surface part.

In the disc brake device according to the present invention, the tongue-shaped part provided to the leaf spring extends from the rotor circumferential tip region of the inner circumferential surface part or the outer circumferential surface part toward the connection surface part, has the tip region elastically engaging with the side wall (the inner circumferential side wall or the outer circumferential side wall) of the recess, and biases the pad-receiving surface part toward the base wall of the recess. There is thus generated force of pushing the pad-receiving surface part of the leaf spring toward the base wall of the recess at the support member. In this case, the pad-receiving surface part and the base wall of the recess are less likely to form a gap therebetween.

In the disc brake device according to the present invention, behavior of the brake pad is stabilized when the rotor circumferential tip end of the protrusion provided at the backing plate of the brake pad engages so as to transmit torque, with the base wall of the recess at the support member via the pad-receiving surface part of the leaf spring during braking. This configuration is less likely to generate braking noise due to unstable behavior of the brake pad during braking.

In order to embody the present invention described above, the tip region of the tongue-shaped part can be bent to curve an engagement surface of the tongue-shaped part with the side wall of the recess. In this case, the tongue-shaped part is less likely to be caught by the side wall of the recess to improve assembly of the leaf spring to the recess. Furthermore, in order to embody the present invention described above, the connection surface part of the leaf spring can be provided with support retentive parts elastically sandwiching along a rotor axis, the recess at the support member, so as to be rotor radially spaced apart from the pad-receiving surface part. In this case, even when the support retentive parts of the leaf spring are elastically deformed into a substantially V shape to sandwich the recess at the support member to curve into the arch shape the connection surface part at the region close to the support retentive parts, this region (the region deformed into the arch shape) is rotor radially spaced apart from the pad-receiving surface part. Accordingly, the deformation into the arch shape hardly affects the pad-receiving surface part.

BRIEF DESCRIPTION OF DRAWINGS

FIG. 1 is a front view of a disc brake device according to an embodiment of the present invention.

FIG. 2 is a rear view of the disc brake device depicted in FIG. 1.

FIG. 3 is a side view of the disc brake device depicted in FIGS. 1 and 2.

FIG. 4 is a sectional view taken along line X-X indicated in FIG. 3.

FIG. 5 is an enlarged view of a Y portion depicted in FIG. 4.

FIG. 6 is a perspective view of a leaf spring depicted in FIG. 5, in a free state (alone).

FIG. 7 is a schematic view of a relation between the leaf spring and a recess depicted in FIG. 5 (in a state where a brake pad is removed in the state depicted in FIG. 5).

FIG. 8 is a perspective view of the leaf spring depicted in FIGS. 1 to 6, according to a modified embodiment.

FIG. 9 is a schematic view corresponding to FIG. 7, of a relation between the leaf spring and the recess depicted in FIG. 8.

FIG. 10 is a perspective view of a leaf spring having an inner/outer integral structure according to an embodiment.

FIG. 11 is a perspective view of a conventional leaf spring according to an embodiment.

FIG. 12 is a schematic view corresponding to FIG. 7, of a relation between the leaf spring and the recess depicted in FIG. 11.

DESCRIPTION OF EMBODIMENTS

An embodiment of the present invention will now be described below with reference to the drawings. FIGS. 1 to 7 depict a disc brake device of a movable caliper type for a vehicle according to an embodiment of the present invention. A disc brake device 100 according to this embodiment includes a disc rotor 10 (see a virtual line indicated in FIG. 1) assembled to an axle hub (a rotating member not depicted) and configured to rotate integrally with wheels (not depicted), a support member (mounting) 20 assembled to a vehicle body (not depicted), a movable caliper 30 disposed so as to extend over part of the outer circumference of the disc rotor 10 and assembled to the support member 20 so as to be movable rotor axially, a single piston (push member) 40 assembled to the movable caliper 30, an inner brake pad 50, and an outer brake pad 60. The disc brake device 100 further includes a pair of leaf springs (pad support springs) 70 and 80 assembled to inner and outer sides of the support member 20, respectively.

The disc rotor 10 has an annular braked surface 11 configured to be sandwiched between a lining 52 of the inner brake pad 50 and a lining 62 of the outer brake pad 60. Rotation of the disc rotor 10 is braked during braking because the braked surface 11 is sandwiched between the lining 52 of the inner brake pad 50 and the lining 62 of the outer brake pad 60.

As depicted in FIGS. 1 to 4, the support member 20 is provided to extend over part of the outer circumference of the disc rotor 10, and integrally includes an inner support part 21 supporting the inner brake pad 50, an outer support part 22 supporting the outer brake pad 60, and an attachment part 23 to the vehicle body.

As depicted in FIGS. 1 to 4, the movable caliper 30 is provided to extend over part of the outer circumference of the disc rotor 10, and includes a cylinder part 31 on the inner side, a push arm part 32 on the outer side, and a pair of connection parts 33 and 34 connecting the cylinder part 31 and the push arm part 32. The movable caliper 30 includes a pair of support arm parts 35 and 36 on the inner side, and is assembled to the support member 20 so as to be movable rotor axially via a connection pin (not depicted) assembled to the support arm parts 35 and 36 with bolts 37 and 38 and extending rotor axially.

The piston 40 is assembled to the cylinder part 31 of the movable caliper 30 via an annular seal member (not depicted) as being known, so as to be liquid-tight and rotor axially slidable, and is disposed so as to push the inner brake pad 50 toward the disc rotor 10. The piston 40 is pushed by hydraulic oil supplied from a brake master cylinder (not depicted) to an oil sac provided between the cylinder part 31 and the piston 40 while the disc rotor 10 is being braked, so as to press rotor axially, the inner brake pad 50 toward the disc rotor 10. When the piston 40 pushes and presses rotor axially the inner brake pad 50 toward the disc rotor 10, the movable caliper 30 is moved rotor axially by reactive force and the push arm part 32 of the movable caliper 30 pushes and presses rotor axially the outer brake pad 60 toward the disc rotor 10.

As depicted in FIGS. 2 and 4, the inner brake pad 50 includes a backing plate 51, the lining 52 firmly fixed to the backing plate 51, and a shim plate 53 assembled to the rear surface of the backing plate 51. The inner brake pad 50 is disposed between the disc rotor 10 and the piston 40 and is assembled so as to be movable rotor axially and rotor circumferentially, to recesses 21a and 21b provided at the inner support part 21 of the support member 20 via leaf springs 70 and 80 at protrusions 51a and 51b provided at a rotor circumferential end of the backing plate 51.

As depicted in FIG. 1, the outer brake pad 60 includes a backing plate 61, the lining 62 firmly fixed to the backing plate 61 (see FIG. 3), and a shim plate 63 assembled to the rear surface of the backing plate 61. The outer brake pad 60 is disposed between the disc rotor 10 and the push arm part 32 of the movable caliper 30 and is assembled so as to be movable rotor axially and rotor circumferentially, to recesses 22a and 22b provided at the outer support part 22 of the support member 20 via the leaf springs 70 and 80 at protrusions 61a and 61b provided at a rotor circumferential end of the backing plate 61.

The leaf springs 70 and 80 are assembled to the inner support part 21 and the outer support part 22 of the support member 20, respectively. As exemplified in FIGS. 5 and 6, the leaf spring 80 assembled to the inner support part 21 has a C-shaped part 81, a tongue-shaped part 82, and a pair of support retentive parts 83, as well as a pad retentive part 84 and a pad guide part 85. Each of the leaf springs 70 and 80 is made of a spring steel plate having a predetermined thickness, and is manufactured bilaterally symmetrically by punching the spring steel plate into a predetermined shape and then bending into a formed shape.

The C-shaped part 81 includes a connection surface part 81a having a pad-receiving surface part 81a1, an outer circumferential surface part 81b extending rotor circumferentially from a rotor radially outward end region of the connection surface part 81a, and an inner circumferential surface part 81c extending rotor circumferentially from a rotor radially inward end region of the connection surface part 81a. As depicted in FIG. 5, the pad-receiving surface part 81a1 comes into contact with a rotor circumferential tip end of a torque transmission part 51b1 of the protrusion 51b at the backing plate 51, and is provided rotor radially spaced apart from the support retentive part 83.

The tongue-shaped part 82 extends from the rotor circumferential tip region of the inner circumferential surface part 81c toward the connection surface part 81a, and as schematically depicted in FIG. 7, has a tip region 82a elastically engaging with an inner circumferential wall 21b1 of the recess 21b, and biases the pad-receiving surface part 81a1 toward a base wall 21b2 of the recess 21b. The tongue-shaped part 82 is formed by bending a tongue that is provided at part of the inner circumferential surface part 81c (rotor axially intermediate region) as a cut part A in a U shape. The tongue-shaped part 82 has the tip region bent to curve an engagement surface of the tongue-shaped part 82 with the inner circumferential wall 21b1 of the recess 21b. The cut part A forming the tongue may not be in the U shape.

The support retentive parts 83 elastically sandwich the recess 21b along the rotor axis, to prevent disengagement of the leaf spring 80 from the recess 21b. The pad retentive part 84 biases the backing plate 51 rotor radially outward to elastically suppress rotor radial movement of the brake pad 50. The pad guide part 85 guides the backing plate 51 of the brake pad 50 when the backing plate 51 is assembled to the recess 21b at the leaf spring 80 so as to improve assembly of the brake pad 50.

According to this embodiment described above, the tongue-shaped part (82) provided to each of the leaf springs (70 and 80) extends from the rotor circumferential tip region of the inner circumferential surface part (81c) toward the connection surface part (81a), elastically engages with the inner circumferential wall (21b1) of the recess (21b) at the tip region (82a), and biases the pad-receiving surface part (81a1) toward the base wall (21b2) of the recess (21b). There is thus generated force of pushing the pad-receiving surface part (81a1) of each of the leaf springs (70 and 80) toward the base wall (21b2) of the recess (21b) at the support member 20. In this case, the pad-receiving surface part (81a1) and the base wall (21b2) of the recess (21b) are less likely to form a gap therebetween.

In the disc brake device according to this embodiment, behavior of the brake pads (50 and 60) are stabilized during braking when the rotor circumferential tip end of the torque transmission part (51b1) of the protrusion (51b) provided at the backing plate of the brake pad engages so as to transmit torque, with the base wall (21b2) of the recess (21b) via the pad-receiving surface part (81a1) of the leaf spring. This configuration is less likely to generate braking noise due to unstable behavior of the brake pads (50 and 60) during braking.

According to the above embodiment, the tip region (82a) of the tongue-shaped part (82) is bent to curve the engagement surface of the tongue-shaped part (82) with the inner circumferential wall (21b1) of the recess (21b). The tongue-shaped part (82) is thus less likely to be caught by the inner circumferential wall (21b1) of the recess (21b) to improve assembly of each of the leaf springs (70 and 80) to the recess (21b).

According to the above embodiment, the support retentive parts (the regions elastically sandwiching the recess at the support member 20 along the rotor axis) (83) of each of the leaf springs (70 and 80) are rotor radially spaced apart from the pad-receiving surface part (81a1). The support retentive parts (83) are thus elastically deformed into a substantially V shape to sandwich the recess (21b). Even when the connection surface part (81a) at the region approaching the support retentive parts (83) is curved into an arch shape, this region (the region deformed into the arch shape) is rotor radially spaced apart from the pad-receiving surface part (81a1). Accordingly, the deformation into the arch shape hardly affects the pad-receiving surface part (81a1).

The leaf spring 80 exemplified in FIGS. 6 and 7 is applied in the above embodiment. Alternatively, a leaf spring 180 exemplified in FIGS. 8 and 9 is also applicable to the present invention. The leaf spring 180 depicted in FIGS. 8 and 9 includes a tongue-shaped part 182 formed by bending a tongue that is provided by extending by a predetermined amount, part of an inner circumferential surface part 181c. There is further provided a pad retentive part 184 by swelling and deforming rotor radially outward a rotor circumferential intermediate region of the inner circumferential surface part 181c. The remaining configurations are the same as those of the leaf spring 80 described above. These configurations of the leaf spring 180 are thus denoted by reference signs that are obtained by adding 100 to the reference signs of the corresponding configurations in the leaf spring 80 and will not be described repeatedly.

The inner leaf springs (70 and 80) and the outer leaf springs (70 and 80) are provided separately in both of the above embodiments. Alternatively, the present invention can adopt a leaf spring 290 having an inner/outer structure as depicted in FIG. 10. This leaf spring 290 includes a leaf spring part 270 corresponding to the leaf spring 70 and a leaf spring part 280 corresponding to the leaf spring 80, and the leaf spring parts 270 and 280 are connected integrally with each other. The configurations included in each of the leaf spring parts 270 and 280 are substantially the same as the configurations in the leaf spring 80. These configurations in the leaf spring parts 270 and 280 are thus denoted by reference signs that are obtained by adding 200 to the reference signs of the corresponding configurations in the leaf spring 80 and will not be described repeatedly.

As exemplified in FIG. 5, the torque transmission part 51b1 of the protrusion 51b at the backing plate 51 is set on the inner circumference side in the rotor radial direction in each of the embodiments described above. The tongue-shaped part 82 thus extends from the rotor circumferential tip region of the inner circumferential surface part 81c toward the connection surface part 81a. In contrast, if the torque transmission part (51b1) of the protrusion of the backing plate is set on the outer circumference side in the rotor radial direction, the tongue-shaped part (82) preferably extends from the rotor circumferential tip region of the outer circumferential surface part (81b) toward the connection surface part (81a).

The present invention is applied to a disc brake device of a movable caliper type for a vehicle in each of the embodiments described above. The present invention is similarly applicable to a disc brake device of a fixed caliper type for a vehicle.

The invention claimed is:

1. A disc brake device comprising:
   a disc rotor configured to rotate integrally with wheels;
   a support member assembled to a vehicle body;
   a pair of brake pads disposed to sandwich part of the disc rotor and assembled to the support member so as to be moveable rotor-axially and rotor-circumferentially; and
   a push member configured to push a backing plate of each of the brake pads toward the disc rotor, wherein
   the backing plate of each of the brake pads being provided, at a rotor circumferential end, with a protrusion projecting in the circumferential direction of the rotor, the support member being provided with a recess accommodating the protrusion at the backing plate so as to be movable rotor-axially and rotor-circumferentially, the protrusion and the recess being provided therebetween with a leaf spring, said leaf spring being accommodated in the recess and assembled to the support member and retaining the backing plate, and
   the protrusion having a rotor circumferential tip end set to engage so as to transmit torque, with a base wall of the recess via a pad-receiving surface part of the leaf spring, wherein
   the leaf spring includes a C-shaped part having a connection surface part provided with the pad-receiving surface part, an outer circumferential surface part extending rotor-circumferentially from a rotor radially outward end region of the connection surface part, and an inner circumferential surface part extending rotor-circumferentially from a rotor radially inward end region of the connection surface part, a radially innermost portion of the connection surface part being in contact with the support member and forming an acute angle with the inner circumferential surface part, and
   the leaf spring further includes a tongue-shaped part that extends from a rotor circumferential tip region of the inner circumferential surface part toward the connection surface part, and the tongue-shaped part has a tip region elastically engaging with a side wall of the recess, and biases the pad-receiving surface part toward the base wall of the recess,
   wherein the tongue-shaped part comprises a bent tongue that is provided as a cut part at part of the inner circumferential surface part, and
   the rotor circumferential tip region of the inner circumferential surface part and the cut part extend to the rotor radially inward direction from the side wall of the recess in the state where the protrusion is assembled in the recess.

2. The disc brake device according to claim 1, wherein the tongue-shaped part is formed as an extension, by a predetermined amount, of the part of the inner circumferential surface part.

3. The disc brake device according to claim 1, wherein the tip region of the tongue-shaped part is bent to curve an engagement surface of the tongue-shaped part with the side wall of the recess.

4. The disc brake device according to claim 1, wherein the connection surface part of the leaf spring is provided with support retentive parts elastically sandwiching along a rotor axis, the recess at the support member, so as to be rotor radially spaced apart from the pad-receiving surface part.

5. The disc brake device of claim 1, wherein the recess further includes a second side wall facing the side wall and connected to the side wall by the base wall.

6. The disc brake device of claim 1, wherein an intersection of the base wall with the side wall is abutted by the C-shaped part.

* * * * *